Dec. 2, 1952　　　　　F. H. REAM　　　　　2,619,786
ROTATING CUTTING DISK TYPE MOWER
Filed April 10, 1950
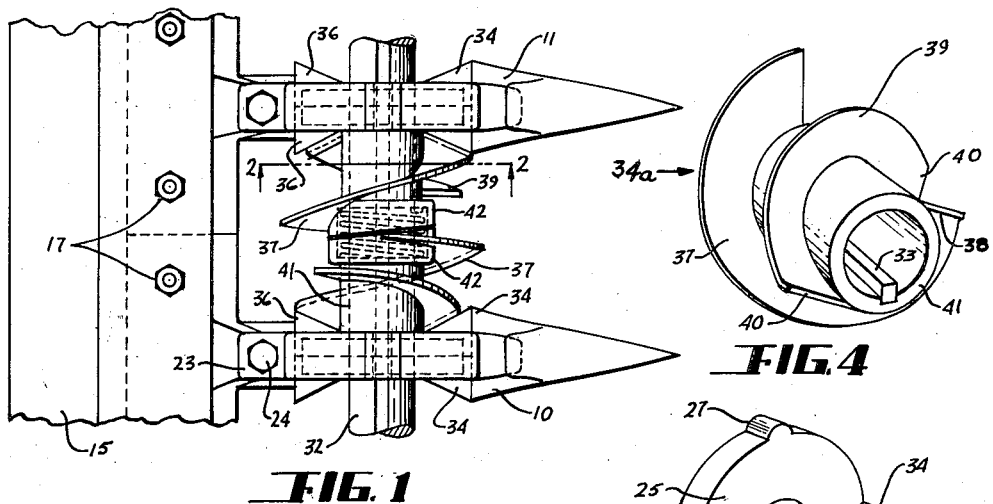
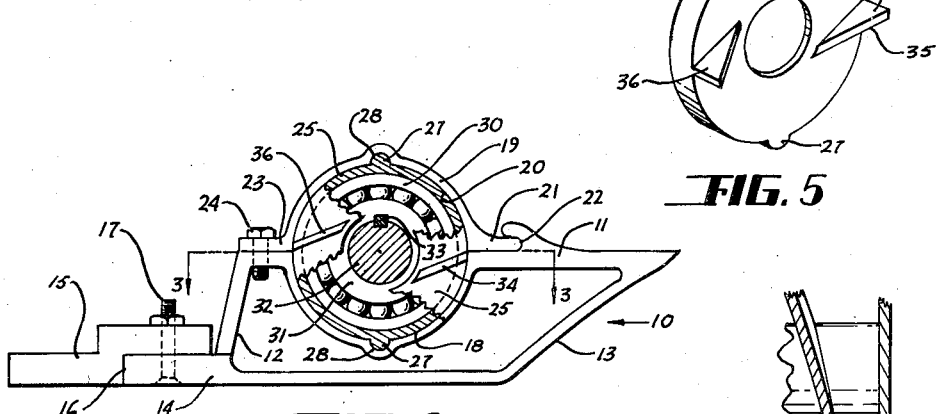
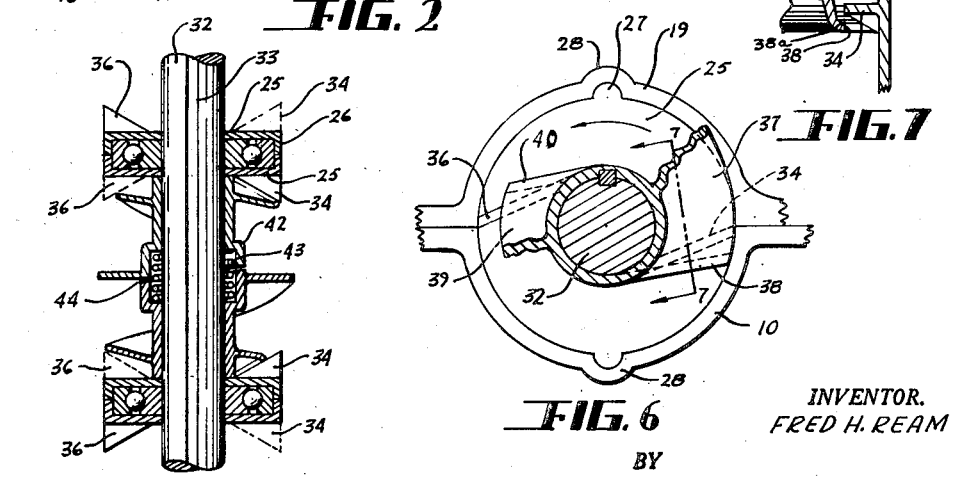
INVENTOR.
FRED H. REAM
BY
HIS ATTORNEY Patented Dec. 2, 1952

2,619,786

UNITED STATES PATENT OFFICE 2,619,786

ROTATING CUTTING DISK TYPE MOWER

Fred H. Ream, Dayton, Ohio

Application April 10, 1950, Serial No. 154,919

20 Claims. (Cl. 56—256)

This invention relates to a mowing machine.

One object of the invention is to provide a rotary cutting unit for a mowing machine which is simple in construction, efficient in operation and of such a character that a plurality of units may be assembled in axial alinement on a single supporting bar.

A further object of the invention is to provide a cutting unit comprising a rotary cutting element cooperating with a stationary cutting element and having means for moving grass or the like laterally toward said stationary cutting element as the unit moves forwardly.

A further object of the invention is to provide a cutting unit having a stationary cutting element adjacent each end thereof and two rotatable spiral elements having cutting edges to cooperate with the respective stationary cutting elements and arranged to move the grass toward the respective stationary cutting elements.

A further object of the invention is to provide a cutting unit having a plurality of stationary cutting elements associated with a single rotary cutting device and in which any one of the stationary elements may be positioned in cutting relation to the rotary cutting device.

A further object of the invention is to provide such a cutting unit having simple and efficient means for mounting the same between two ground engaging shoes and in which the cutting element, or elements, are easily removable.

Other objects of the invention may appear as the unit is described in detail.

In the accompanying drawings Fig. 1 is a plan view of the cutting unit embodying the invention, with the supporting bar and shaft broken away; Fig. 2 is a transverse section taken on line 2—2 of Fig. 1 and partly broken away; Fig. 3 is a longitudinal section taken on the line 3—3 of Fig. 2; Fig. 4 is a perspective view of a spiral cutting element; Fig. 5 is a perspective view of a bearing supporting member having blades fixed thereto; Fig. 6 is a transverse section showing the bearing supporting member and blades in elevation and showing the spiral cutting elements in section; and Fig. 7 is a sectional detail of the blade and the cutting edge of the spiral element.

In these drawings I have illustrated a single cutting unit embodying a preferred form of the invention, but it is to be understood that the unit as a whole, as well as the several parts thereof, may take various forms without departing from the spirit of the invention, and that a mowing machine may include any desired number of units and may be used for cutting grass, grain, or any similar vegetation.

The cutting unit may be mounted on any suitable movable support and is here shown as mounted on an elongate bar which is adapted to be supported and moved transversely to its length in a well known manner. It may comprise a part of a mowing machine or may be provided with means of a known character for connecting the same with a farm tractor and driving the cutting elements from the power output element of the tractor.

Each cutting unit comprises two laterally spaced shoes, 10 and 11, each of which includes an upright portion 12, in the nature of a runner having an upwardly and forwardly inclined lower surface 13 to enable it to move over uneven ground or obstructions on the ground. At its rear end the shoe is provided with a rearwardly extending part 14 which is rigidly secured to the supporting bar, 15, the latter being, in the present instance, provided with a recess 16 into which the part 14 extends and in which it is rigidly secured, as by bolts 17. The upright portion of the shoe has therein a recess 18 which is preferably semi-circular in shape. Each shoe also includes a detachable upper portion 19 having therein a recess 20 corresponding in size and shape to the recess 18, and in the form shown the portion 19 is substantially semi-circular. The removable portion 19 may be detachably attached to the main portion of the shoe in any suitable manner and as here shown it is provided with a forwardly extending lip 21 which extends into a recess 22 in the upwardly extending part of the shoe, and at its rear end it is provided with a rearwardly extending lip 23 which is rigidly secured to the shoe, as by screws 24. Mounted within the opening formed by the recesses 18 and 19 is a bearing supporting structure which preferably comprises two annular members 25 having circumferential flanges 26 which abut one against the other. These bearing supporting members are rigidly secured in the opening in the shoe but are removable therefrom. As here shown, each bearing member 25 is provided with a lug, or lugs, 27, preferably two, which extend into shallow recesses 28 in the upper and lower portions of the shoe. Mounted in each of the bearing supporting members is an antifriction bearing 30, in the inner races 31 of which is mounted a shaft 32 which is rigidly secured thereto by a key, or spline, 33, and which constitutes the means for rotating the rotary cutting device hereinafter described. Rigidly secured to the face of each bearing supporting member 25 is a blade 34 which preferably is located in front of the shaft and extends substantially in the line of movement of the unit. This blade may be of any suitable character and, as here shown, it is triangular in form and is secured to, and may be formed integral with, the bearing supporting member 25 with its outer end approximately in the horizontal axial plane of the shaft 32 and with its inner end slightly below that plane. The edge 35 of the blade which constitutes the hypotenuse of the triangle, is the cutting edge and is inclined both rearwardly and downwardly toward the shaft and rearwardly and laterally toward the bearing member 25. In the present arrangement each bearing supporting member is provided with a second blade 36 which is preferably identical with the blade 34 and is secured to the bearing supporting member in the same manner and in a position diametrically opposite the blade 34. By removing the semi-circular portion 19 of the shoe the bearing supporting member can be moved through an arc of 180° to locate the blade 36 in the position in which the blade 34 is shown, thus enabling the blade 36 to be substituted for the blade 34 when the latter has become dull or worn.

Mounted on the shaft 32 for rotation therewith is a cutting device 34a having a rotary cutting edge which is movable across and in cutting relation to the blade 34. In the present instance, the bearing supporting members 25 at both ends of the unit are provided with blades 34 and 36 and two rotatable cutting devices are mounted on the shaft in axial alinement and cooperate respectively with the blades on the shoes 10 and 11. Preferably each cutting device includes a spiral element 37 having adjacent one end thereof a cutting edge 38 arranged to move across the corresponding blade 34 in cutting relation thereto. The shaft 32, as viewed in Fig. 2, rotates counterclockwise and the spiral element is so arranged that its cutting edge is moved upwardly across and in engagement with the blade 34. Preferably the spiral element is provided with a narrow laterally extending edge portion 38a on which the cutting edge 38 is formed, and which is so positioned with relation to the spiral element that it will move upwardly across the cutting edge of the fixed blade 34 with a shearing action as the spiral element rotates. The cutting edge 38 will also engage the rear blade 36 but has only a limited cutting operation therewith, as will hereinafter appear. In order that there may be two cutting operations by each cutting device upon each rotation of the shaft, each cutting device also includes a second spiral cutting element 39 having a cutting edge 40 movable in the same path of rotation as the cutting edge 38 of the spiral element 37 and is spaced circumferentially from said cutting edge 38, preferably 180°, so that the two cutting edges will successively engage the cutter 34 as the unit moves forwardly. In the present instance the spiral element 37 comprises approximately a full convolution. The second spiral element 39 comprises approximately one-half of a convolution and is mounted between the ends of the spiral element 37. The two spiral elements 37 and 39 are rigidly connected one with the other and may be mounted on the shaft in any suitable manner. As here shown, they are rigidly secured to a sleeve 41 which in turn is mounted on the shaft 32 and rigidly secured thereto, as by the spline 33 which connects the shaft with the bearing. This spline permits a slight movement of the rotatable cutting device lengthwise of the shaft and means are provided for yieldably urging the same toward the fixed blade so as to maintain the cutting edges of the spiral elements at all times in cutting relation to the fixed blade and to compensate for wear on either the spiral elements or the fixed blade. When, as in the present instance, the unit comprises two rotatable cutting devices the two devices are preferably identical and are mounted on the shaft with the cutting edges thereof adjacent the fixed blades on the respective shoes 10 and 11, and with their inner ends adjacent one to the other. The sleeves 41 of the two devices are provided at their adjacent ends with cup shape portions 42 and a spring 43 is mounted in these cup shape portions and tends to move both rotatable cutting devices toward their respective fixed blades. It will be noted in Fig. 3 that the adjacent ends of the cup shape members 42 extend obliquely to the axis of the shaft so as to enable the adjacent ends of the two spiral elements 39 to be supported approximately in a vertical plane at right angles to the axis of rotation, as shown at 44.

The spiral elements are of such radial width that as the unit is moved forwardly by the propelling mechanism each spiral element will engage successive portions of the grass or grain, and move the same into engagement with the respective fixed blades where it is engaged and severed by the cutting edges of the spiral elements. The severed grass is carried rearwardly across the shaft and over the rear fixed blades 36 which direct the same away from the shaft and prevent the same from winding about the shaft. Should any of the severed grass move downwardly across the cutting edge of a rear blade it will be engaged by the cutting edge of the corresponding spiral element and again severed, thus preventing it from winding about the shaft.

Both bearing supporting members on each shoe are provided with fixed blades 34 and 36, thus enabling each shoe to constitute a part of two adjacent units and there may be as many units in one series as is desired. It will be understood, of course, that the outer bearing supporting members 25 of the two end shoes of a series of shoes need not be provided with fixed blades.

While I have shown a preferred embodiment of my invention, I wish it to be understood that I do not desire to be limited to the details thereof as various modifications may occur to a person skilled in the art.

Having now fully described my invention, what I claim as new and desire to secure by Letters Patent, is:

1. A cutting unit for a mower of the type comprising a cutter supporting bar movable transversely to its length, including a ground engaging shoe having means whereby it may be secured to said bar in forwardly extending relation thereto, a fixed blade supported on said shoe and having a cutting edge extending lengthwise of and spaced laterally from said shoe, a rotary device supported adjacent said shoe for rotation about an axis transverse to the line of movement of said shoe and having a substantially radial cutting edge to cooperate with said blade, and means for rotating said element in a direction to move said cutting edge upwardly in cutting relation to said blade.

2. A cutting unit for a mower of the type comprising a cutter supporting bar movable transversely to its length, including a ground engaging shoe having means whereby it may be secured to said bar in forwardly extending relation thereto, a fixed blade supported on said shoe and having a cutting edge extending lengthwise of and spaced laterally from said shoe, a spiral element supported adjacent said shoe for rotation about an axis transverse to the line of movement of said shoe and having at that end thereof adjacent said shoe a substantially radial cutting edge to cooperate with said blade, and means for rotating said spiral element in a direction to move said cutting edge upwardly in cutting relation to said blade, said spiral element being of substantial radial width to move successive portions of grass toward said blade and into the path of said cutting edge.

3. A cutting unit for a mower of the type comprising a cutter supporting bar movable transversely to its length, including a ground engaging shoe having means whereby it may be secured to said bar in forwardly extending relation thereto, a fixed blade supported on said shoe, a spiral element supported adjacent said shoe for rotation about an axis transverse to the line of movement of said shoe and having a substantially radial cutting edge to cooperate with said blade, means for rotating said spiral element in a direction to move said cutting edge upwardly in cutting relation to said blade, said spiral element being of substantial radial width to move successive portions of grass toward said blade and into the path of said cutting edge, and means for yieldably urging said spiral element axially toward said fixed blade.

4. A cutting unit for a mower of the type comprising a cutter supporting bar movable transversely to its length, including two ground engaging shoes having means whereby they may be secured to said bar in forwardly extending and longitudinally spaced relation thereto, two spiral elements supported between said shoes for rotation about a common axis, a fixed blade carried by each shoe in front of the axis of rotation of said spiral elements, said spiral elements having at the ends thereof which are adjacent said shoes cutting edges to cooperate with the respective blades, and means for rotating said spiral elements in a direction to move said cutting edges upwardly in cutting relation to the respective blades.

5. A cutting unit for a mower of the type comprising a cutter supporting bar movable transversely to its length, including two ground engaging shoes having means whereby they may be secured to said bar in forwardly extending and longitudinally spaced relation thereto, two spiral elements supported between said shoes for rotation about a common axis, a fixed blade carried by each shoe in front of the axis of rotation of said spiral elements, said spiral elements having at the ends thereof which are adjacent said shoes cutting edges to cooperate with the respective blades and being of a radial width to engage grass in advance of said blades, and means for rotating said spiral elements in a direction to move successive portions of said grass toward each blade and to move said cutting edges upwardly in cutting relation to the respective blades.

6. A cutting unit for a mower of the type comprising a cutter supporting bar movable transversely to its length, including two ground engaging shoes having means whereby they may be secured to said bar in forwardly extending and longitudinally spaced relation thereto, two spiral elements supported between said shoes for rotation about a common axis, a fixed blade carried by each shoe in front of the axis of rotation of said spiral elements, said spiral elements having at the ends thereof which are adjacent said shoes cutting edges to cooperate with the respective blades and being of a radial width to engage grass in advance of said blades, means for rotating said spiral elements in a direction to move successive portions of said grass toward each blade and to move said cutting edges upwardly in cutting relation to the respective blades, and means for yieldably urging said spiral elements toward the respective blades.

7. A cutting unit for a mower of the type comprising a cutter supporting bar movable transversely to its length, including a ground engaging shoe having means whereby it may be secured to said bar in forwardly extending relation thereto, a fixed blade supported on said shoe, a cutting device supported adjacent said shoe for rotation about an axis transverse to the line of movement of said shoe and including two spiral elements each having a cutting edge movable in cooperative relation to said fixed blade and spaced circumferentially one from the other, and means for rotating said cutting device in a direction to successively move said cutting edges upwardly in cutting relation to said fixed blade.

8. A cutting unit for a mower of the type comprising a cutter supporting bar movable transversely to its length, including a ground engaging shoe having means whereby it may be secured to said bar in forwardly extending relation thereto, a fixed blade supported on said shoe, a cutting device supported adjacent said shoe for rotation about an axis transverse to the line of movement of said shoe and including a sleeve, a spiral element on said sleeve comprising approximately a single convolution and having a cutting edge adjacent one end thereof, a second spiral element mounted on said sleeve between the ends of the first mentioned spiral element and comprising materially less than one convolution and having a cutting edge adjacent one end thereof, said cutting edges being spaced circumferentially one from the other and being movable substantially in a common path, and means for rotating said cutting device to move said cutting edges successively past said fixed blade and in cutting relation thereto.

9. A cutting unit for a mower of the type comprising a cutter supporting bar movable transversely to its length, including a plurality of ground engaging shoes having means whereby they may be secured to said bar in forwardly extending and longitudinally spaced relation thereto and having alined bearings, a shaft rotatable in said bearings, a fixed blade supported on one of said shoes in front of said shaft and having a cutting edge, a spiral element secured to said shaft between adjacent shoes for rotation therewith and having at that end thereof adjacent said fixed blade a cutting edge movable across said fixed blade in cutting relation thereto, said spiral element being of such radial width that it will move successive portions of grass into engagement with said fixed blade in the path of the cutting edge of said spiral element.

10. A cutting unit for a mower of the type comprising a cutter supporting bar movable transversely to its length, including a plurality of ground engaging shoes having means whereby they may be secured to said bar in forwardly extending and longitudinally spaced relation thereto and having alined bearings, a shaft rotatable in said bearings, a fixed blade supported on one of said shoes in front of said shaft and having a cutting edge, a spiral element secured to said shaft between adjacent shoes for rotation therewith and having at that end thereof adjacent said fixed blade a cutting edge movable across said fixed blade in cutting relation thereto, said spiral element being of such radial width that it will move successive portions of grass into engagement with said fixed blade in the path of the cutting edge of said spiral element, and means for yieldably urging said spiral element axially toward said fixed blade.

11. A cutting unit for a mower of the type comprising a cutter supporting bar movable transversely to its length, including a plurality of ground engaging shoes having means whereby they may be secured to said bar in forwardly extending and longitudinally spaced relation thereto and having alined bearings, a shaft rotatable in said bearings, a fixed blade supported on each shoe in front of said shaft and having a cutting edge extending substantially in the line of movement of said unit, and spiral elements secured to said shaft for rotation therewith between the fixed blades on the respective shoes, each spiral element having a cutting edge movable past the adjacent fixed blade in cutting relation thereto, whereby upon the forward movement of said unit said spiral elements will move successive portions of grass into engagement with the respective fixed blades where it will be severed by said cutting edges of said spiral elements.

12. A cutting unit for a mower of the type comprising a cutter supporting bar movable transversely to its length, including a plurality of ground engaging shoes having means whereby they may be secured to said bar in forwardly extending and longitudinally spaced relation thereto and having alined bearings, a shaft rotatable in said bearings, a fixed blade supported on each shoe in front of said shaft and having a cutting edge extending substantially in the line of movement of said unit, and cutting devices secured to said shaft for rotation therewith adjacent the fixed blades of the respective shoes, and each including two spiral elements having cutting edges spaced circumferentially one from the other and movable successively past the fixed blade on the adjacent shoe in cutting relation thereto.

13. A cutting unit for a mower of the type comprising a cutter supporting bar movable transversely to its length, including a plurality of ground engaging shoes having means whereby they may be secured to said bar in forwardly extending and longitudinally spaced relation thereto and having alined bearings, a shaft rotatable in said bearings, a fixed blade supported on each shoe in front of said shaft and having a cutting edge extending substantially in the line of movement of said unit, sleeves mounted on said shaft for rotation about the axis thereof adjacent the blades on the respective shoes, a spiral element on each sleeve having adjacent one end thereof a laterally extending edge portion constituting a cutter, said spiral elements rotating in a direction to move said cutter upwardly in cutting relation to the respective fixed blades and being of a substantial radial width to move successive portions of grass to be cut toward said blade and into the path of said cutter.

14. A cutting unit for a mower of the type comprising a cutter supporting bar movable transversely to its length, including a plurality of ground engaging shoes having means whereby they may be secured to said bar in forwardly extending and longitudinally spaced relation thereto and having alined bearings, a shaft rotatable in said bearings, fixed blades supported on the respective shoes of each pair of adjacent shoes, two spiral elements mounted on said shaft for rotation therewith between the shoes of each pair of shoes, said spiral elements having at the ends thereof which are adjacent the respective shoes cutting edges, said cutting edges being movable by the rotation of said spiral elements upwardly past and in cutting relation to the fixed blades on the adjacent shoes.

15. A cutting unit for a mower of the type comprising a cutter supporting bar movable transversely to its length, including a plurality of ground engaging shoes having means whereby they may be secured to said bar in forwardly extending and longitudinally spaced relation thereto and having alined bearings, a shaft rotatable in said bearings, fixed blades supported on the respective shoes of a pair of adjacent shoes, two spiral elements mounted on said shaft between the shoes of said pair of shoes for rotation with said shaft and for limited axial movement with relation to said shaft, said spiral elements being provided with cutting edges movable past and in cutting relation to the respective blades by the rotation of said spiral elements, and spring means yieldably urging said spiral elements toward the respective fixed blades.

16. A cutting unit for a mower of the type comprising a cutter supporting bar movable transversely to its length, including a plurality of ground engaging shoes having means whereby they may be secured to said bar in forwardly extending and longitudinally spaced relation thereto and having alined openings therethrough, bearing supporting members mounted in the respective openings, bearings in said supporting members, a shaft rotatable in said bearings, a spiral element mounted on said shaft between the shoes of a pair of adjacent shoes for rotation with said shaft and having at one end thereof a cutting edge, and a fixed blade secured to the bearing supporting member of that shoe which is adjacent the cutting edge of said spiral element, said fixed blade being positioned in front of said shaft in operative relation to said cutting edge.

17. A cutting unit for a mower of the type comprising a cutter supporting bar movable transversely to its length, including a plurality of ground engaging shoes having means whereby they may be secured to said bar in forwardly extending and longitudinally spaced relation thereto and having alined openings therethrough, bearing supporting members removably mounted in the respective openings, bearings in the openings of said supporting members, a shaft rotatable in said bearings, a spiral element mounted on said shaft between the shoes of a pair of adjacent shoes for rotation with said shaft and having at one end thereof a cutting edge, and fixed blades secured in circumferentially spaced positions to the bearing supporting member of that shoe which is adjacent the cutting edge of said spiral element, one only of said blades being supported in operative relation to said cutting edge of said spiral element, said bearing supporting member being adjustable to reverse the positions of said fixed blades.

18. A cutting unit for a mower of the type comprising a cutter supporting bar movable transversely to its length, including a plurality of ground engaging shoes having means whereby they may be secured to said bar in forwardly extending and longitudinally spaced relation thereto and having alined openings therethrough, bearing supporting members mounted in the respective openings, bearings in said supporting members, a shaft rotatable in said bearings, a fixed blade secured to the bearing supporting member in each of two adjacent shoes in front of said shaft and having a cutting edge extending transversely to said shaft, and two spiral elements mounted on said shaft in axial alinement for rotation therewith between said adjacent shoes, each spiral element having at that end thereof adjacent the corresponding shoe a cutting edge which is movable by said shaft upwardly across and in cutting relation to the fixed blade on the bearing member in said shoe.

19. A cutting unit for a mower of the type comprising a cutter supporting bar movable transversely to its length, including a plurality of ground engaging shoes having means whereby they may be secured to said bar in forwardly extending and longitudinally spaced relation thereto and having alined openings therethrough, bearing supporting members mounted in the respective openings, bearings in said supporting members, a shaft rotatable in said bearings, two fixed blades mounted on each bearing supporting member on opposite sides of said shaft, each bearing supporting member being adjustable about its axis to support either blade in front of said shaft, two spiral elements mounted on said shaft in axial alinement for rotation with said shaft, each spiral element having at that end thereof adjacent one of said shoes a cutting edge movable by said shaft upwardly and across and in cutting relation to the corresponding fixed blade which is in front of said shaft, and means for yieldably urging said spiral members toward the respective shoes.

20. A cutting unit for a mower of the type comprising a cutter supporting bar movable transversely to its length, including a ground engaging shoe having means whereby it may be secured to said bar in forwardly extending relation thereto, a fixed blade supported on said shoe, a spiral element supported adjacent said shoe for rotation about an axis transverse to the line of movement of said shoe and having adjacent one end thereof a relatively narrow laterally extending portion provided with a cutting edge to cooperate with said blade, and means for rotating said spiral element in a direction to move said cutting edge upwardly in cutting relation to said blade, said spiral element being of substantial radial width to move successive portions of grass toward said blade and into the path of said cutting edge.

FRED H. REAM.

REFERENCES CITED

The following references are of record in the file of this patent:

UNITED STATES PATENTS

| Number | Name | Date |
|---|---|---|
| 1,231,174 | Koons | June 26, 1917 |
| 1,957,758 | Campbell | May 8, 1934 |